United States Patent
Muller et al.

[11] 3,900,346
[45] Aug. 19, 1975

[54] METHOD FOR THE AUTOMATIC GUIDANCE OF A WORK TOOL ON THE CURVES OF INTERSECTION OF TWO PIPES OR TUBES

[76] Inventors: Willi Muller, Ophovenerstr. 14-20, 567 Opladen; Hans Noll, Am Werth 16, 4019 Hitdorf, both of Germany

[22] Filed: Sept. 10, 1973

[21] Appl. No.: 395,638

[30] Foreign Application Priority Data
Nov. 4, 1972 Germany............................ 2254147

[52] U.S. Cl................................ 148/9.6; 266/23 N
[51] Int. Cl......................... B23k 7/04; B23k 7/10
[58] Field of Search........ 148/9.6; 266/23 N, 23 NN; 33/21 R, 21 C

[56] References Cited
UNITED STATES PATENTS

| | | | |
|---|---|---|---|
| 1,826,164 | 10/1931 | Carrier, Jr. et al. | 266/23 NN |
| 2,379,630 | 7/1945 | Fall | 33/21 C |
| 2,422,338 | 6/1947 | Christensen | 148/9.6 |
| 2,570,026 | 10/1951 | Delaney | 266/23 NN |
| 2,974,415 | 3/1961 | Werner | 266/23 NN |
| 3,362,699 | 1/1968 | Hiratsuka et al. | 266/23 NN |

*Primary Examiner*—W. Stallard
*Attorney, Agent, or Firm*—Holman & Stern

[57] ABSTRACT

The automatic guiding of a work tool on the curves of intersection of two pipes or tubes whose axes are at an acute cutting angle to each other and wherein at least one of the pipes has a noncylindrical cross section and one of the pipes rotates around its own axis, or the work tool rotates around this axis, wherein the work tool, during a relative rotation of the pipe and tool around the pipe axis with a speed of $v$ is moved parallel to the pipe axis in accordance with the following equation:

$$v = \frac{R}{\sin\alpha} + \frac{r}{tg\alpha} - \cos\gamma \frac{R}{\sin\alpha} - \cos\phi \frac{r}{tg\alpha}$$

in which $R$ = the radius of the latter-mentioned pipe;

$r$ = the radius of the other pipe;

$\alpha$ = the sharp angle under which the axes of both pipes are intersecting each other;

$\phi$ = the angle by which the pipe R is rotated;

$$\frac{\sin\dfrac{r}{\sin\alpha}}{\dfrac{R}{\sin\alpha}}$$

4 Claims, 4 Drawing Figures

METHOD FOR THE AUTOMATIC GUIDANCE OF A WORK TOOL ON THE CURVES OF INTERSECTION OF TWO PIPES OR TUBES

BACKGROUND OF THE INVENTION

The present invention relates to a method for the automatic guidance of a tool on the curves of intersection of two pipes, with the axes of the pipes being at an acute cutting angle to each other. In the connection of two of such types of pipes, there result situations during which a tool must be guided on the lines of self-intersection of the two pipes, for example, when cutting out an opening on the convex surface of the larger pipe and when the end of the smaller pipe is to be cut off, as well as when the two pipes are being welded together.

In a situation in which the circumference of the pipes is precisely circular, such curves of intersection then have a comparatively simple geometric form. For this purpose, devices have been developed to automatically guide a tool on such curves of intersection, whereby the pipe is rotated by its axis and the tool is guided parallel to this axis at a speed which is adjusted to comply with the rotational speed so that the tool operates constantly on the desired curves of intersection, and attention is invited to German Pat. Nos. 937,387; 940,027; and 961,588. However, such devices are suitably only in situations in which both pipes have a circular cross section.

SUMMARY OF THE INVENTION

The task of the present invention is in automatically guiding a work tool on the convex surface of a first pipe along the curves of intersection of the first pipe with a second pipe, the axis of the second pipe intersecting the first pipe at an acute angle while the first pipe rotates around its axis, or the tool rotates around the axis of the pipe, in a case in which the cross section of one pipe or of both pipes is noncylindrical. This problem results, for instance, in a case wherein one of the pipes has a noncircular cross section, such as an oval, lens-shaped, teardrop-shaped or an angular profile, as well as in a situation wherein one of the pipes has a very large diameter since generally in such a situation its circumference deviates from the intended circular form. Thus, the curves of intersection on such pipes are cut according to an empirical curve of intersection which is established from case to case and the cuts were corrected after the assembling operations.

In contrast thereto, in accordance with this invention, the tool is guided automatically along the curves of intersection of noncylindrical pipes. According to the invention this problem is solved in that the work tool is guided parallel to the abovementioned axis according to the following equation:

$$v = \frac{R}{\sin\alpha} + \frac{r}{\tg\alpha} - \cos\gamma \frac{R}{\sin} - \cos\phi \frac{r}{\tg}$$

in which
R = the radius of the latter-mentioned pipe;
r = the radius of the other pipe;
$\alpha$ = the sharp angle under which the axes of both pipes are intersecting each other;
$\phi$ = the angle by which the pipe R is rotated;

$$\sin\phi = \frac{\sin\phi \frac{r}{\sin\alpha}}{\frac{R}{\sin\alpha}}$$

The movement of the tool is preferably effected in a manner in which the square root from the sum of the squares of the relative movement of one point of the surface of the pipe to the tool and the speed of the tool parallel to the axis of the pipe, are constant. The cutting direction of the cutting device, which is guided along the curves of intersection, is adjusted continuously during the cutting operation, preferably automatically, in such a way that the width of the cutting area is of an equal size at all corresponding points of the two pipes.

Further objects and advantages of the invention will become more readily apparent to one skilled in the art from the following description and annexed drawings and in which drawings:

DETAILED DESCRIPTION OF THE INVENTION

Figure 1:
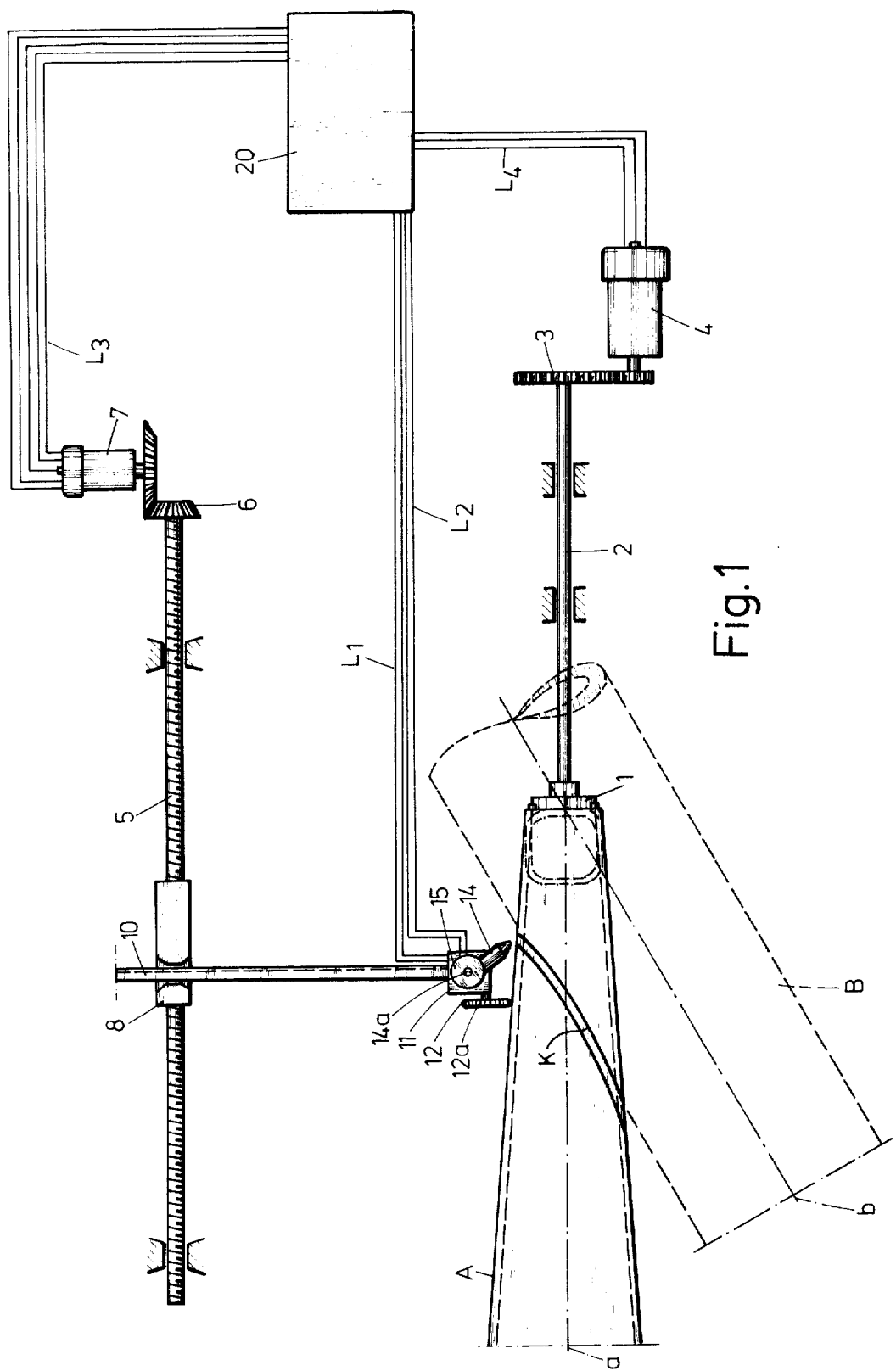
FIG. 1 is a view diagrammatically illustrating an arrangement for guiding a cutting tool along the curves of intersection of a pipe for cutting off the end of the pipe.

In FIG. 1 is illustrated a conical pipe A from which the smaller end is to be cut off along a curve K at which curve the pipe A intersects the form of a pipe B. The cross section of the pipe A is a square provided with rounded corners.

The smaller end of the pipe A is clamped to a face plate 1, or similar holding device, which face plate is connected to the end of a shaft 2 mounted for rotation, so that the pipe A is located on the axis $a$ of the shaft 2. The shaft 2 is rotated via gears 3, 3a on the shaft 2 and shaft 4a of an electric motor 4.

A spindle 5 which is located parallel to the shaft 2 is rotated by bevel gears 6,6a on the spindle 5 and shaft 7a of an electric motor 7. A nut 8 is mounted on the spindle 5 and the nut is provided with an arm 10 which extends at a right angle to the axis $a$ of the pipe A. A sliding carriage 11 is movable along the arm 10. A tracking wheel 12 is connected to a device by means of a shaft 12a which is positioned on the carriage 11 so that the device signals to a computer 20 by a circuit $L_1$ the position and running speed of the tracking wheel 12. On the carriage 11 is also arranged a cutting torch 14 mounted to be tiltable around a shaft 14a by means of a motor 15. The governor of the computer 20 is connected with the motors 15, 7 and 4, respectively, by circuits $L_2$, $L_3$ and $L_4$ in such a manner that it determines the speed of these motors.

While the pipe A is slowly rotated about its longitudinal axis by means of the electric motor 4, the cutting torch 14 is moved parallel to this axis by means of the nut 8. The relation of the speed $v$ parallel to the axis of the pipe A is regulated by the computer 20, depending on the rotational angle $\phi$, around which is rotated the pipe A by the motor 4, in accordance with the following equation:

$$v = \frac{R}{\sin\alpha} + \frac{r}{\text{tg}\alpha} - \cos\gamma\, \frac{R}{\sin\alpha} - \cos\phi\, \frac{r}{\text{tg}\alpha}$$

in which $R$ = the radius of the latter-mentioned pipe;
$r$ = the radius of the other pipe;
$\alpha$ = the sharp angle under which the axes of both pipes are intersecting each other;
$\phi$ = the angle by which the pipe R is rotated;

$$\sin\psi = \frac{\sin\phi\, \frac{r}{\sin\alpha}}{\frac{R}{\sin\alpha}}$$

The cutting torch 14 is thus retained constantly in such a position by means of the motor 15 and the direction of intersection is adjusted so that the width of the intersecting plane is of an even size at all respective points of the two pipes.

Figure 3:
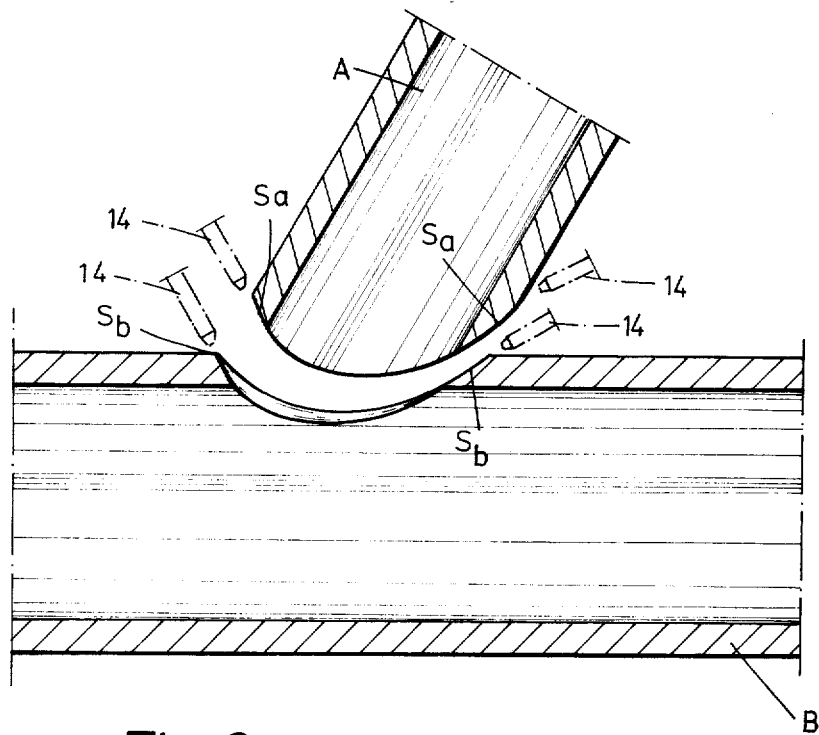
FIG. 3 is a fragmentary view in cross section through a first pipe and a second pipe which enters the first pipe at an inclined angle.
Figure 4:
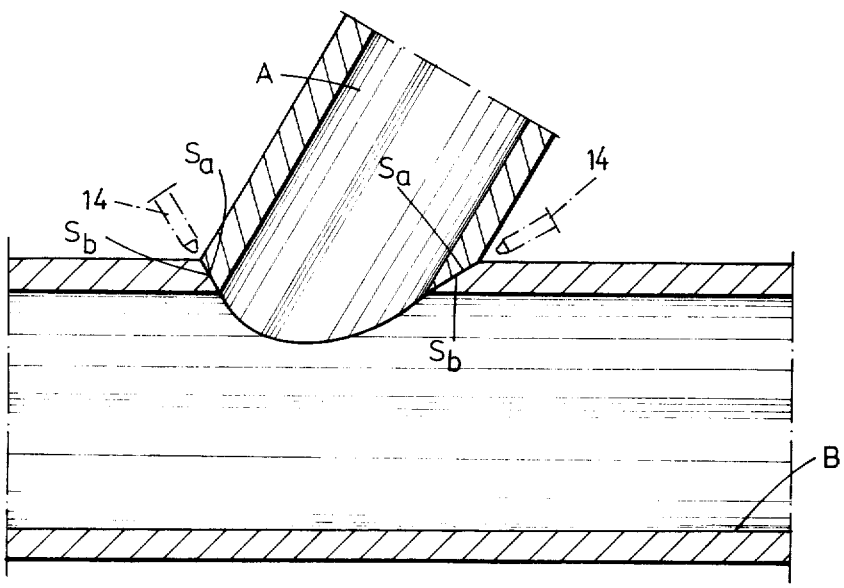
FIG. 4 is a view similar to FIG. 3 in which the pipes have different wall thicknesses.

In the embodiment illustrated in FIG. 3, in which the walls of the pipes A and B are of equal thicknesses, the intersecting plane S$a$ of the pipe A is of the identical width as the intersecting plane S$b$ of the pipe B. In the longitudinal cross section as shown, these intersecting planes are located in the bisectrix of the angle $\alpha$ or the complementary angle 180°–$\alpha$. By means of the motor 15, the cutting torch 14 is thus pointed in the direction of the intersecting plane S$a$ or S$b$. This angle changes during the cutting operation. If the wall thicknesses of the two pipes vary, then the angles differ greatly from the angles which result in pipes with walls of equal thickness, and this is illustrated in FIG. 4.

Figure 2:
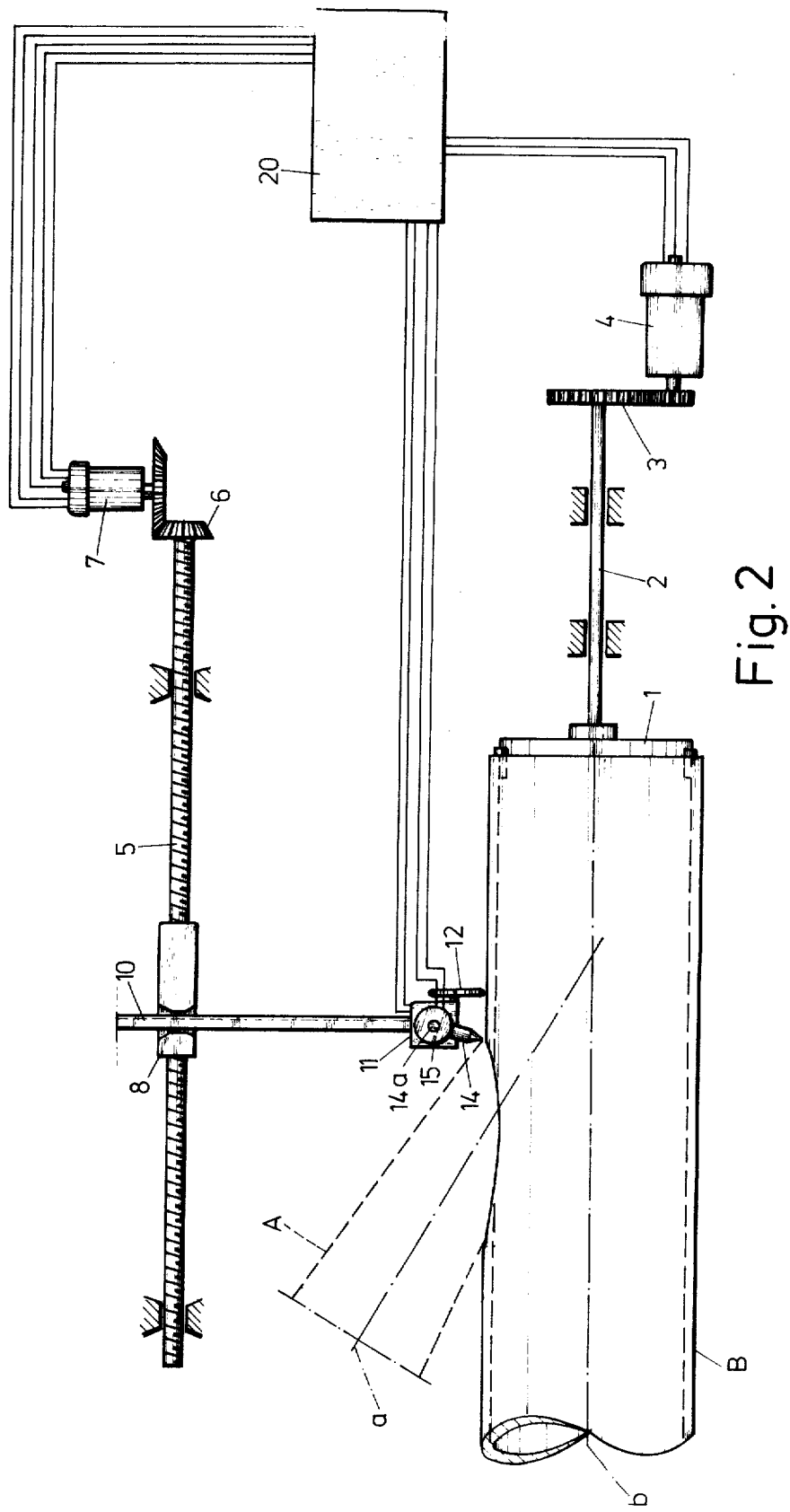
FIG. 2 is a view similar to FIG. 1 illustrating the same arrangement during the cutting of a section from the wall of another pipe.

As above mentioned, FIG. 2 corresponds to FIG. 1, but with the difference that in lieu of the conical pipe A, whose end is to be cut along the curve of intersection K, a piece is cut out from the convex surface of the larger pipe B according to the curve of intersection K.

It was established as advantageous to adhere to a certain relation between the speed with which the cutting torch 14 is moved into the direction of the axis of the pipe A or B and the speed at which the pipe A or pipe B is rotated about its axis. Preferably, such speeds are so selected that the square root from the sum of the squares of the two speeds remains constant.

While FIGS. 1 and 2 illustrate the pipes A and B which are being cut, are rotated about their axis with the cutting tool or torch 14 being moved parallel to the axis of such pipes, the pipe may also be stationary, while the tool is moved around the axis of the pipe. This is particularly efficacious in pipes having larger diameters.

This invention is not to be confined to any strict conformity to the showings of the drawings, but changes or modifications may be made therein so long as such changes or modifications mark no material departure from the spirit and scope of the appended claims.

We claim:

1. A method for automatically guiding a cutting tool on the curve of intersection of two pipes, one of which has a non-cylindrical cross section and in which the axes of the pipes are at an acute cutting angle to each other, comprising the steps of: effecting relative rotation between one of the pipes and the cutting tool about the axis of the pipe, and moving the cutting tool along the pipe axis with a speed of $v$ parallel to the pipe axis in accordance with the following equation:

$$v = \frac{R}{\sin\alpha} + \frac{r}{\text{tg}\alpha} - \cos\gamma\, \frac{R}{\sin\alpha} - \cos\phi\, \frac{r}{\text{tg}\alpha}$$

in which $R$ = the radius of the latter-mentioned pipe;
$r$ = the radius of the other pipe;
$\alpha$ = the sharp angle under which the axes of the two pipes intersect;
$\phi$ = the angle by which the pipe R is rotated;

$$\sin\gamma = \frac{\sin\alpha\, \frac{r}{\sin\alpha}}{\frac{R}{\sin\alpha}}$$

2. The method as claimed in claim 1 in which said one pipe is rotated around its own axis.

3. The method as claimed in claim 1 in which said cutting tool is rotated around the axis of said one pipe.

4. The method as claimed in claim 1 in which the square root from the sum of the squares of the relative speed of one point of the surface to the cutting tool and the speed of the tool parallel to the axis of the pipe is constant.

* * * * *